United States Patent
Bertolini et al.

(10) Patent No.: US 12,247,622 B2
(45) Date of Patent: Mar. 11, 2025

(54) BEARING UNIT WITH SENSORIZED INNER RING

(71) Applicant: AKTIEBOLAGET SKF, Gothenburg (SE)

(72) Inventors: Andrea A. Bertolini, Carrara (IT); Fausto Baracca, Massa (IT); Vittorio Zanella, Orbassano (IT); Maria Grazia Semeraro, Rivalta di Torino (IT)

(73) Assignee: AKTIEBOLAGET SKF (SE)

( * ) Notice: Subject to any disclaimer, the term of this patent is extended or adjusted under 35 U.S.C. 154(b) by 113 days.

(21) Appl. No.: 17/988,078

(22) Filed: Nov. 16, 2022

(65) Prior Publication Data

US 2023/0160430 A1 May 25, 2023

(30) Foreign Application Priority Data

Nov. 24, 2021 (IT) .................. 102021000029615

(51) Int. Cl.
*F16C 19/06* (2006.01)
*F16C 19/52* (2006.01)
*F16C 33/58* (2006.01)

(52) U.S. Cl.
CPC ............ *F16C 33/585* (2013.01); *F16C 19/06* (2013.01); *F16C 19/525* (2013.01); *F16C 19/527* (2013.01); *F16C 33/586* (2013.01); *F16C 2233/00* (2013.01)

(58) Field of Classification Search
CPC ...... F16C 19/06; F16C 19/525; F16C 19/527; F16C 33/585; F16C 33/586; F16C 2233/00; F16C 2300/22; F16C 2322/34; F16C 33/045
See application file for complete search history.

(56) References Cited

U.S. PATENT DOCUMENTS

| 6,948,856 | B2* | 9/2005 | Takizawa ............ F16C 33/586 |
| | | | 384/448 |
| 2018/0238384 | A1* | 8/2018 | Katsuno ................ F16C 25/08 |
| 2021/0010540 | A1 | 1/2021 | Baracca et al. |
| 2023/0043890 | A1 | 2/2023 | Bertolini et al. |
| 2023/0160422 | A1 | 5/2023 | Bertolini et al. |

FOREIGN PATENT DOCUMENTS

| JP | 2003042151 | 2/2003 |
| WO | 2008110201 | 9/2008 |

OTHER PUBLICATIONS

Search Report for corresponding Italy Patent Application No. 102021000029615 dated Jun. 30, 2022.

* cited by examiner

*Primary Examiner* — Phillip A Johnson
(74) *Attorney, Agent, or Firm* — Reed Smith LLP

(57) ABSTRACT

A bearing unit for a marble cutting machine, comprising a radially outer ring, rotatable about an axis of rotation (X) of the bearing unit and provided with a radially outer flange portion; a stationary radially inner ring having a raceway and a through hole; a row of rolling bodies interposed between the radially outer ring and the radially inner ring; a seat formed in the radially inner ring and shaped as a portion of a circular crown; and a sensor fit in the seat, wherein a ratio between an internal diameter (D) of the through hole and an axial thickness (t) of the radially inner ring is between 6.7 and 11.1.

20 Claims, 4 Drawing Sheets

BEARING UNIT WITH SENSORIZED INNER RING

CROSS-REFERENCE TO RELATED APPLICATIONS

This application is based on and claims priority to Italian Patent Application No. 102021000029615 filed on Nov. 24, 2021, under 35 U.S.C. § 119, the disclosure of which is incorporated by reference herein.

FIELD

The present disclosure relates to a bearing unit provided with a sensorized radially inner ring. Such a bearing unit is suitable for applications in the manufacturing sector and especially in the marble cutting industry.

BRIEF DESCRIPTION OF THE DRAWINGS

The disclosure will now be described with reference to the attached drawings, which show non-limiting exemplary embodiments of a bearing unit, in which.

DETAILED DESCRIPTION

Bearing units of marble cutting machines are subjected to high levels of vibration and high temperatures during the normal course of operation. The vibrations created by the impact of the cutting tools on the blocks of marble to be cut are transmitted to the structure of the machine and to the bearing units causing damage that reduces the operating life of the component parts of the bearing unit and of the bearing unit as a whole.

Multiple bearing units are often assembled in a "pack" form that makes it difficult to dissipate the heat produced by friction between wires used to cut the marble and corresponding pulleys that operate the wires. Additional heat is generated by rolling friction from relative rotation of the rings of the bearing unit, particularly on the raceways of the rings. Evidently, heat dissipation is even more difficult in the innermost bearing units of the bearing unit pack, since these central units are more isolated from the external environment. This heat can cause wear that further reduces the operating life of the component parts of the bearing unit and the bearing unit as a whole.

In manufacturing, and in particular in the marble cutting industry, known bearing units have very restricted axial dimensions, since they are mounted axially adjacent to each other, forming a "pack" of bearing units. This dimensional limitation makes it necessary to use complex and/or costly technical solutions. Components must have small overall axial dimensions while still providing a high level of performance.

Known bearing units have a first component, e.g., a radially outer ring or a radially inner ring, which may be fixed to a rotating element, and a second component, e.g., a radially inner ring or a radially outer ring, which may be fixed to a stationary element. The rotation of one component with respect to the other is allowed by a plurality of rolling bodies that are positioned between a cylindrical surface of the first component and a cylindrical surface of the second component, these surfaces usually being called raceways. The rolling bodies may be balls, cylindrical or tapered rollers, needle rollers, or similar rolling bodies.

Users of marble cutting machines often avoid running their machines at more than 110° C., and must therefore control the temperature. Considerable volumes of cooling water are used for this purpose to remove the greatest possible amount of heat. However, it is difficult to determine the exact volume or the correct temperature of the water needed to reduce the temperature of the machine to a safe operating temperature.

Accordingly, an object of the present disclosure is to provide a bearing unit that is free of the aforementioned drawbacks.

This object may be achieved, for example, by providing a radially inner ring of a bearing unit with a sensor for monitoring the level of vibrations and temperature in the bearing unit.

Figure 1:
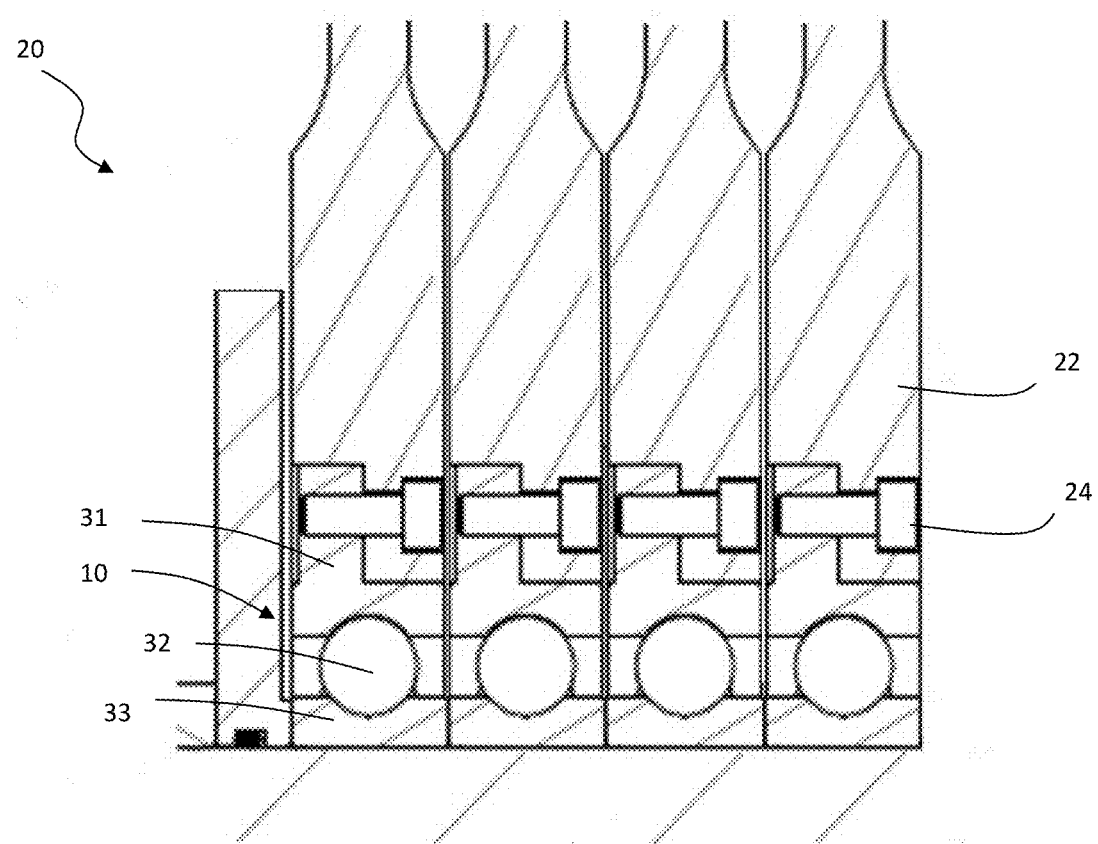
FIG. 1 is a partial schematic view of an assembly of a plurality of bearing units for a marble cutting machine.

FIG. 1 illustrates an exemplary embodiment of a marble cutting machine 20 suitable for producing marble slabs (known and not illustrated for simplicity of illustration) of a reduced thickness, about 13 mm.

Machine 20 may include a plurality of pulleys 22 that enable movement of a plurality of cutting wires (known and not shown for simplicity of illustration) for cutting marble.

In various embodiments, pulleys 22 are positioned axially adjacent to each other, and their axial spacing defines a thickness of the marble slabs produced. Rotation of each pulley 22 is allowed by a corresponding bearing unit 10.

A bearing unit 10 may include a radially inner ring 33 and a flanged radially outer ring 31 that rotates relative to inner ring 33 by means of a plurality of rolling bodies 32 interposed between inner ring 33 and outer ring 31. Outer ring 31 may include a radially outer flange 25, to which a corresponding pulley 22 is attached by connector 24, e.g., screws. In various embodiments, bearing unit 10 may further include a cage 34 for containing the plurality of rolling bodies 32 in position in the row of rolling bodies 32.

Each bearing unit 10 may be mounted in close axial contact with each axially adjacent bearing unit 10 in order to reduce the axial distance between two adjacent cutting wires for cutting marble slabs of a very low thickness, and in order to avoid any possible axial play between the bearing units. In particular, each radially inner ring 33 may be located in close axial contact to each radially inner ring 33 of an axially adjacent bearing unit 10 and have an axial thickness greater than an axial thickness of a corresponding radially outer ring 31.

To ensure that a thickness of resulting marble slabs is greatly reduced, a bearing unit 10 for a marble cutting machine 20 may have an axial thickness of itself and of its components, that is to say an axial thickness of radially inner ring 33 and flanged radially outer ring 31, within a range from 18 mm to 30 mm. Bearing unit 10 may further have an inside diameter D of a through hole 30 of radially inner ring 33 of at least 150 mm, and preferably of about 200 mm, so that the ratio between a dimension of the inside diameter "D" and an axial thickness "t" of radially inner ring 33 is between 6.7 and 11.1. This range ensures a suitable axial thickness for obtaining marble slabs of greatly reduced thickness, while maintaining a sufficient stiffness and strength of bearing unit 10.

A bearing unit 10 may further include one or more sealing devices 35 to prevent ingress of contaminants and water. In various embodiments, bearing unit 10 may include two sealing devices 35, each positioned on opposite axial sides of bearing unit 10. Sealing device 35 may be particularly useful in applications that produce abrasive dust, e.g., dust from cutting marble or diamond, and in applications that use cooling liquids, e.g., water, to maintain an operating temperature within acceptable limits. Advantageously, sealing device 35 may increase the strength of bearing unit 10 and thus improve a service life of bearing unit 10.

A skilled artisan would appreciate that the terms and expressions recited in the present disclosure, which indicate positions and orientations such as "radial" and "axial" are to be interpreted as relative to an axis of rotation X of bearing unit 10.

For simplicity of illustration, reference 32 may refer to both an individual rolling body of a row of rolling bodies and to the row of rolling bodies.

In various embodiments, a sealing device 35 interposed between radially inner ring 33 and radially outer ring 31 may include a shield 40 forming a seal against a support surface 31' of a first seat 31a of radially outer ring 31. Shield 40 may therefore be stably fixed to radially outer ring 31, and consequently be rotatable together therewith.

Advantageously, shield 40 may be made of a composite material. By way of non-limiting example, a composite material that may be used includes a very hard polyurethane or a POM acetal resin.

Shield 40 may be held in a stable position by an anchoring element 60, e.g., a snap ring 60 made of metallic material. In various embodiments, snap ring 60 is interference fitted into a second seat 31b of radially outer ring 31, located in an axially outer position relative to the first seat 31a, in order to push shield 40 axially towards support surface 31' of outer ring 31.

Radially inner ring 33 may include a seat 33a formed by a groove or a recess having a frontal cross section comprising a portion of a circular crown having an amplitude (a) varying from 20° to 22° and a radial depth (h), measured from a radially inner cylindrical surface 33b of radially inner ring 33, ranging from 5.1 mm to 5.3 mm. Radially inner ring 33 may further include a sensor 50 fitted stably in seat 33a. In various embodiments, sensor 50 may be a temperature sensor and/or a vibration sensor.

Seat 33a may be provided with an axially inner surface 333 on which sensor 50 bears. Advantageously, seat 33a may be open both in a radially inward direction and in an axially outward direction (relative to a transverse axis (Y) of bearing unit 10), in order to provide a greater volume of seat 33a and consequently for a sensor 50, or a greater volume which resides in the volume of seat 33a. It will be appreciated by a person of ordinary skill in the art that a durability and operating life of a sensor 50 may be improved as available space for sensor 50, and thus a size of sensor 50, increases.

Seat 33a may be formed in a relatively load-free area of radially inner ring 33 such that removal of material causes no diminution in load capacity of bearing unit 10. Furthermore, because seat 33a is open in an axial direction, seat 33a may be visually inspected more easily during demounting and mounting of sensor 50. Additionally, a sensor signal of sensor 50 may be sent without passing through a layer of material, improving transmission of the sensor signal.

On the other hand, the radially inward opening helps to increase the volume available for sensor 50. Defining an opening in a radially outward direction increases risk of excessive weakening of radially inner ring 33. Furthermore, placement of sealing device 35 may be an obstacle to mounting where a radially outward opening is used.

By limiting amplitude (a) of the portion of a circular crown to between 20° and 22°, it is possible to occupy less than 6% of an annular axial surface 33c of radially inner ring 33. This characteristic facilitates axial clamping of bearing unit 10 without creating excessively unbalanced contact forces. Indeed, if amplitude (a) of seat 33a were 180°, then half of axial annular surface 33c would be in contact with an adjacent bearing unit (and would therefore be subject to loading) and half would not be. In this case, axial clamping of bearing unit 10 would create a moment acting on bearing unit 10, significantly shortening the service life of bearing unit 10.

By designing a seat 33a in the shape of a portion of a circular crown with an amplitude (a) of the portion of circular crown in a range of 20° to 22°, it is possible to mitigate the occurrence of such moments, as 94% of axial annular surface 33c of radially inner ring 33 may be in contact with an adjacent bearing unit 10. In other words, when bearing units 10 are axially clamped, the forces tend to balance out and distribute, and transmit uniformly from one bearing unit 10 to an adjacent bearing unit 10.

Additionally, designing seat 33a as a portion of a circular crown with an amplitude of 20° helps maintain sufficient strength in the structure of radially inner ring 33.

Figure 5:
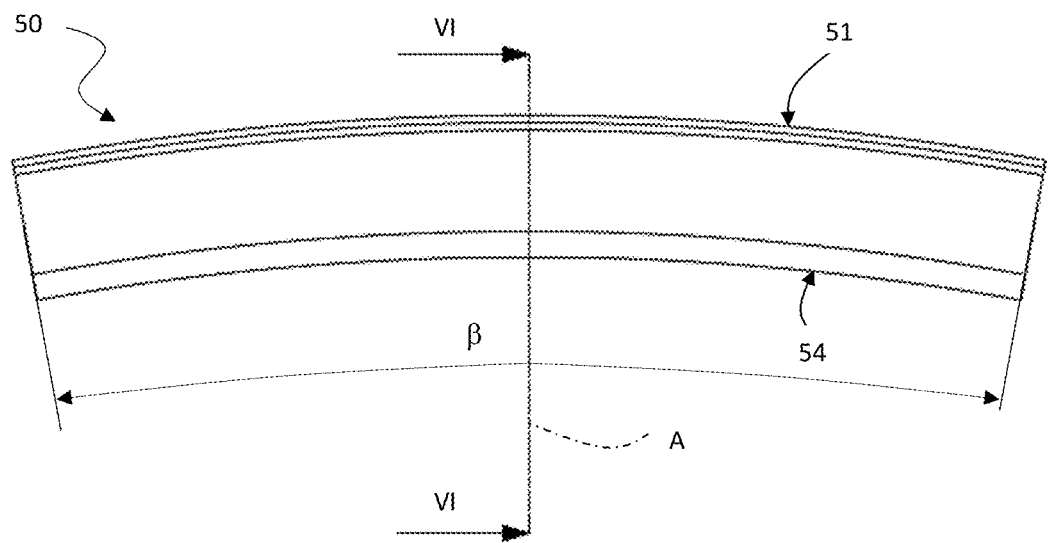
FIG. 5 is an axial view of a sensor for the bearing unit of FIG. 2.
Figure 6:
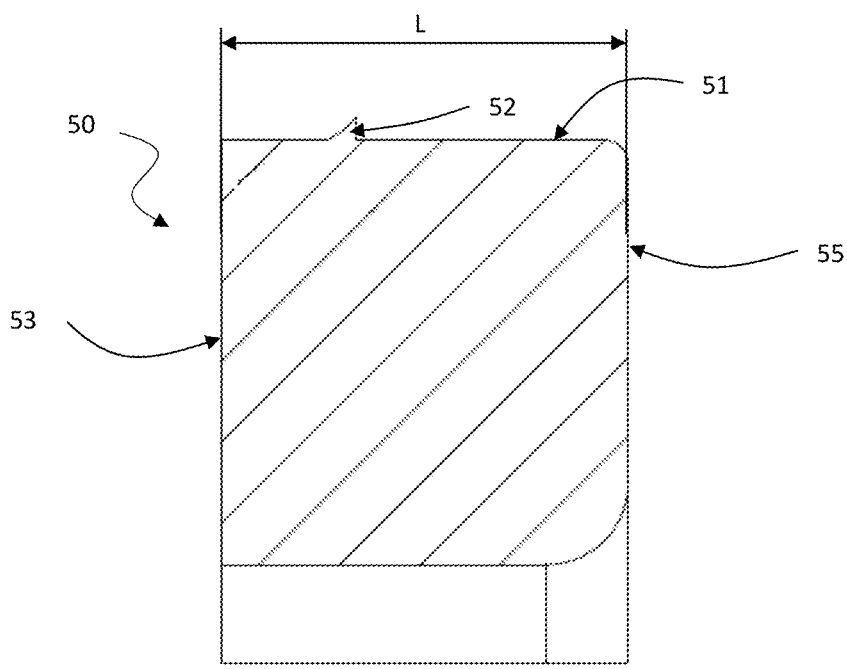
FIG. 6 is a cross sectional view of the sensor of FIG. 5.

As illustrated in FIGS. 5 and 6, a sensor 50 may be axially defined by two semi-annular surfaces, 53 and 55, transverse to an axis A and extending around axis A through an arc of circumference subtended by an angle ($\beta$). Sensor 50 may be radially defined by a radially outer cylindrical surface 51 and a radially inner cylindrical surface 54 facing axis A. To assist in mounting sensor 50 in a correct orientation, sensor 50 may include a protrusion 52 formed in an asymmetrical position on outer cylindrical surface 51 and extending radially outwards from surface 51. Protrusion 52 may be asymmetrical such that it is positioned axially closer to semi-annular surface 53 than to semi-annular surface 55, provided that a sensing element of sensor 50 is also positioned inside sensor 50 closer to semi-annular surface 53 than to semi-annular surface when sensor 50 is mounted.

Dimensions of sensor 50 may be sized such that a whole of seat 33a is occupied when sensor 50 is mounted. In particular, sensor 50 may have a frontal cross section in a shape of a portion of a circular crown having an angle ($\beta$) varying from 18° to 20°, and a substantially square transverse cross section having a side measurement L from 4.7 mm to 4.9 mm.

In various embodiments, sensor 50 transmits data via radio waves and may be a Wi-Fi compatible device. By using Wi-Fi technology, it is possible to avoid design complications that would be caused by having to run a wire into a center of a bearing unit pack that may contain as many as 108 adjacent bearing units. Moreover, since radially outer ring 31 may rotate, using a wired connection would require modifying the shaft to allow a wire to run inside it to a central bearing unit of the bearing unit pack. This solution is inconvenient and costly to produce.

In alternative embodiments, sensor 50 may transmit a signal via Bluetooth. A Wi-Fi signal may be preferable to a Bluetooth signal because Bluetooth may have a lower range than a Wi-Fi signal (e.g., 10 m range for Bluetooth compared to a 100 m range for a Wi-Fi signal). Additionally, a Wi-Fi sensor may sustain multiple connections to multiple devices, whereas a Bluetooth sensor may only connect to a single device at a time.

In various embodiments, sensor 50 may be stably fixed in seat 33a of radially inner ring 33, by gluing for example. Advantageously, an adhesive used for gluing sensor 50 in seat 33a may be compatible with both the material of radially inner ring 33 and the composite material of sensor 50. An example of an adhesive may be one that becomes fully cured on steel in a short time (e.g., six hours at an ambient temperature of 22° C.) while also being suitable for plastic materials. It may also withstand high temperatures, e.g., having a heat resistance at 110° C. or more than 75% at an ambient temperature.

The adhesive may be inserted into seat 33a of radially inner ring 33, while ensuring that a thickness of the adhesive is such that it does not allow sensor 50, when fitted into the seat, to project beyond a maximum dimensions of seat 33a. For the purpose of demounting, the adhesive may be removed by a solvent.

Sensor 50 may be positioned as near to a point of greatest heat generation in radially inner ring 33, e.g., a radially inner raceway 33'. In various embodiments, a minimum distance "d" between raceway 33' and seat 33a may be less than 3 mm. Because radially inner ring 33 may be made of steel, a temperature detected by sensor 50 may be practically the same as a temperature of raceway 33', which may be regarded as a temperature of bearing unit 10.

To ensure that the sensing element of sensor 50 is always in a position nearest raceway 33', seat 33a may be provided with a chamfer 332 formed on a corresponding radially outer surface 331 to define an axial stop for protrusion 52, which, by engaging with chamfer 332, ensures that sensor 50 is correctly mounted.

While stable mounting of sensor 50 on radially inner ring 33 is preferable, e.g., by gluing, it is not critical. In embodiments in which radially inner ring 33 is stationary, risk of detachment is low, since the radially inner ring in this application is not rotatable but is locked against the shaft. Furthermore, because each bearing unit 10 is locked in a bearing unit pack, each sensor 50 is forced to remain in each seat 33a of each radially inner ring 33.

In various embodiments, seat 33a may be positioned opposite an application point "P" of a force "F" acting on radially inner ring 33, relative to transverse axis Y of bearing unit 10. This positioning may be achieved during mounting of bearing unit 10, during operation, or by adjusting marble cutting machine 20.

Figure 2:
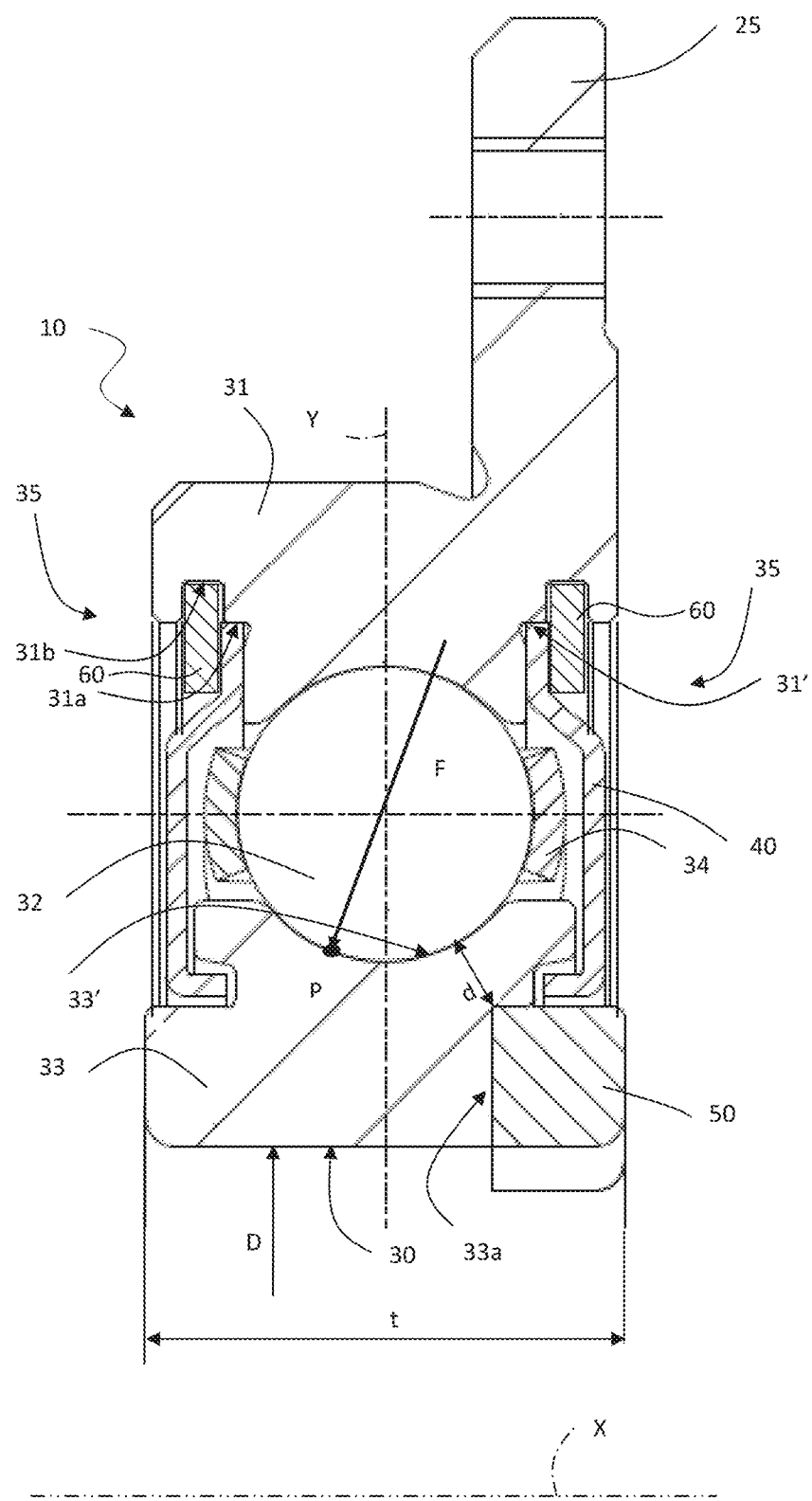
FIG. 2 is a cross-sectional view of a bearing unit according to an exemplary embodiment of the present disclosure.
Figure 3:
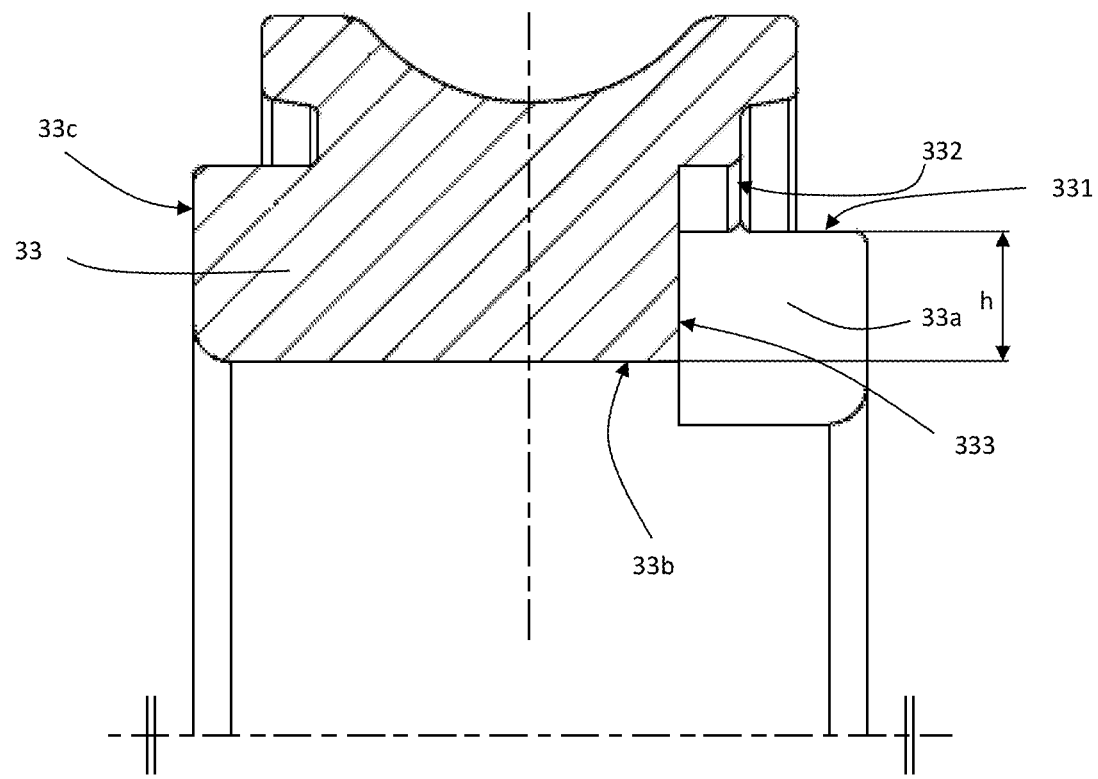
FIG. 3 shows an enlarged cross-sectional view of a radially inner ring of the bearing unit of FIG. 2.
Figure 4:
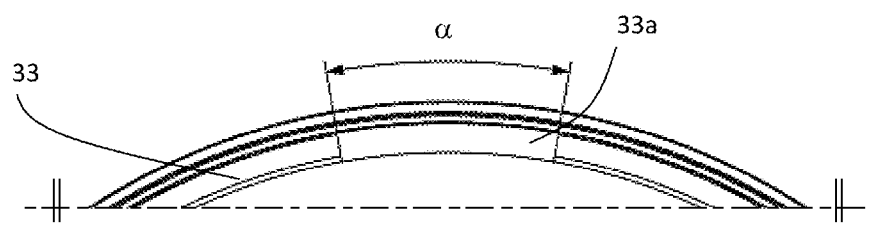
FIG. 4 is a partial axial view of the radially inner ring of FIG. 3.

For example, if a direction of force F transmitted to radially inner ring 33 is radially inward and axially outward (i.e., from the right to the left in FIG. 2), it is advantageous to use bearing unit 10 with a sensor 50 mounted in an axially inner position (i.e., on the right according to FIG. 2). Radially inner ring 33 may thus be under load in a portion where seat 33a is not present (i.e., a portion where there is no absence of material resulting from formation of a seat 33a). This arrangement avoids possible problems caused by truncation or cracking of radially inner ring 33.

Preliminary tests have demonstrated the feasibility of this solution: a sensor was glued stably to the shield of the bearing unit, and the standard test (at 750 r.p.m. for 8 hours) for checking a new bearing unit design for marble cutting machines was conducted. The outcome of the test was positive, since it allowed the temperature of the shield, and therefore of the bearing unit, to be monitored throughout the duration of the test.

The solution with the sensorized bearing unit has considerable advantages. It allows checking of the temperature of the bearing unit in any position by fitting a sensorized bearing unit in any specific position in the bearing unit pack (e.g., the center of the bearing unit pack). Thus the temperature of the whole bearing unit pack can be monitored and checked. By enabling a user of a marble cutting machine 20 to check a temperature and a vibration of a bearing unit 10 during operation, the user may, in real-time, stop the machine or increase a flow of cooling water when a temperature or vibration exceeds operating limits without incurring a risk of burning out one or more of bearing units 10 in a bearing unit pack. Furthermore, since the user is directly checking the temperature, a flow rate and/or temperature of cooling water may be modified so as to increase an amount of heat that can be dissipated by the water. This improves performance of marble cutting machine 20 and does not require marble cutting machine 20 to be stopped in order to make such modifications.

A manufacturer of a marble cutting machine 20 may supply an end user with a machine that is already optimized for a best flow of cooling water, so as to improve performance of machine 20 as far as possible while reducing a temperature of a bearing unit pack during operation.

By implementing a sensor 50 that may check vibrations of a bearing unit pack, a user may set correct operating limits of marble cutting machine 20.

Dimensions of seat 33a for sensor 50 allows for use of sensors of different types to be housed within seat 33a. A volume available for sensor 50 may be of the order of thousands of cubic centimeters. In various embodiments, the volume of seat 33a may be between 1000 $mm^3$ and 1100 $mm^3$. A sensor 50 may therefore be selected on the basis of its service life, the type of measurement, its size, etc.

Finally, by gluing sensor 50 to seat 33a as described herein, sensor 50 may be mounted and dismounted easily and may therefore be replaced in case of breakage without loss of the whole bearing unit 10.

Using a sensorized shield in this way allows for easy alterations in configuration of a bearing unit 10. A sensorized radially inner ring may be supplied on request together with sensor 50 for measuring the temperature and vibration, and a user may use these sensorized bearing units wherever necessary.

A bearing unit 10 sensorized in this way may be fitted in a median position relative to a bearing unit pack for purposes of monitoring the highest temperature levels of the bearing unit pack.

Real-time knowledge of the temperature of a bearing unit 10 enables an operator, during the optimization or use of marble cutting machine 20, to increase or reduce a flow rate of water within a shaft. This makes it possible to avoid always using the greatest possible amount of water, which would clearly be an uneconomical and inefficient solution in terms of consumption and waste.

In addition to the embodiments of the disclosure as described herein, it is to be understood that numerous other variants exist. It is also to be understood that said embodiments are provided solely by way of example and do not limit the object of the disclosure, its applications, or its possible configurations. On the contrary, although the descriptions herein enable one of ordinary skill in the art to implement the present disclosure according to at least one exemplary embodiment, it is to be understood that numerous variations of the components described may be envisaged without thereby departing from the scope of the disclosure as defined in the appended claims, interpreted literally and/or according to their legal equivalents.

We claim:

1. A bearing unit for a marble cutting machine, comprising:
   a radially outer ring, rotatable with respect to an axis of rotation (X) of the bearing unit and comprising a radially outer flange portion;
   a stationary radially inner ring comprising:
      a raceway; and
      a through hole, and
      a seat formed as a portion of a circular crown;
      wherein a ratio of an internal diameter (D) of the through hole and an axial thickness (t) of the radially inner ring is between 6.7 and 11.1;
   a row of rolling bodies interposed between the radially outer ring and the radially inner ring; and
   a sensor inserted inside the seat.

2. The bearing unit of claim 1, wherein the sensor is configured to measure temperature and vibrations and to transmit data via radio waves.

3. The bearing unit of claim 2, wherein the sensor is glued in the seat.

4. The bearing unit of claim 2, wherein,
   the seat comprises a chamfer, and
   the sensor comprises a protrusion coupled to the chamfer.

5. The bearing unit of claim 1, wherein a minimum distance (d) between the raceway and the seat is less than 3 mm.

6. The bearing unit of claim 5, wherein the seat has an amplitude (a) between 20° and 22°.

7. The bearing unit of claim 6, wherein the seat of the radially inner ring has a depth (h) of 5.1 mm to 5.3 mm.

8. The bearing unit of claim 1, wherein the seat is located on a side opposite an application point of a force acting on the radially inner ring about a transverse axis (Y) of the bearing unit.

9. The bearing unit of claim 1, wherein the seat of the radially inner ring is open both in a radially inward direction and in an axially outward direction relative to a transverse axis (Y) of the radially inner ring.

10. The bearing unit of claim 1, wherein,
    the seat comprises a chamfer, and
    the sensor comprises a protrusion coupled to the chamfer.

11. The bearing unit according to claim 1, wherein the sensor comprises a front section shaped as a portion of a circular crown having an amplitude ($\beta$) of between 18° and 20°.

12. The bearing unit according to claim 11, wherein the sensor has a substantially square cross section of an axial side (L) between 4.7 mm and 4.9 mm.

13. A bearing unit for a marble cutting machine, comprising:
    a radially outer ring, rotatable with respect to an axis of rotation (X) of the bearing unit and comprising a radially outer flange portion;
    a stationary radially inner ring comprising:
       a raceway; and
       a through hole, and
       a seat formed as a portion of a circular crown;
       wherein a ratio of an internal diameter (D) of the through hole and an axial thickness (t) of the radially inner ring is between 6.7 and 11.1;
    a row of rolling bodies interposed between the radially outer ring and the radially inner ring; and
    a sensor inserted inside the seat, the sensor comprising a front section shaped as a portion of a circular crown having an amplitude (B) of between 18° and 20°.

14. The bearing unit of claim 13, wherein the sensor is configured to measure temperature and vibrations and to transmit data via radio waves.

15. The bearing unit of claim 13, wherein the sensor is glued in the seat.

16. The bearing unit of claim 13, wherein a minimum distance (d) between the raceway and the seat is less than 3 mm.

17. The bearing unit of claim 16, wherein the seat has an amplitude (a) between 20° and 22°.

18. The bearing unit of claim 17, wherein the seat of the radially inner ring has a depth (h) of 5.1 mm to 5.3 mm.

19. The bearing unit of claim 13, wherein the seat is located on a side opposite an application point of a force acting on the radially inner ring about a transverse axis (Y) of the bearing unit.

20. The bearing unit of claim 13, wherein the seat of the radially inner ring is open both in a radially inward direction and in an axially outward direction relative to a transverse axis (Y) of the radially inner ring.

* * * * *